July 19, 1938. H. L. WARWICK 2,123,980
THERAPEUTIC TREATMENT
Filed July 21, 1934
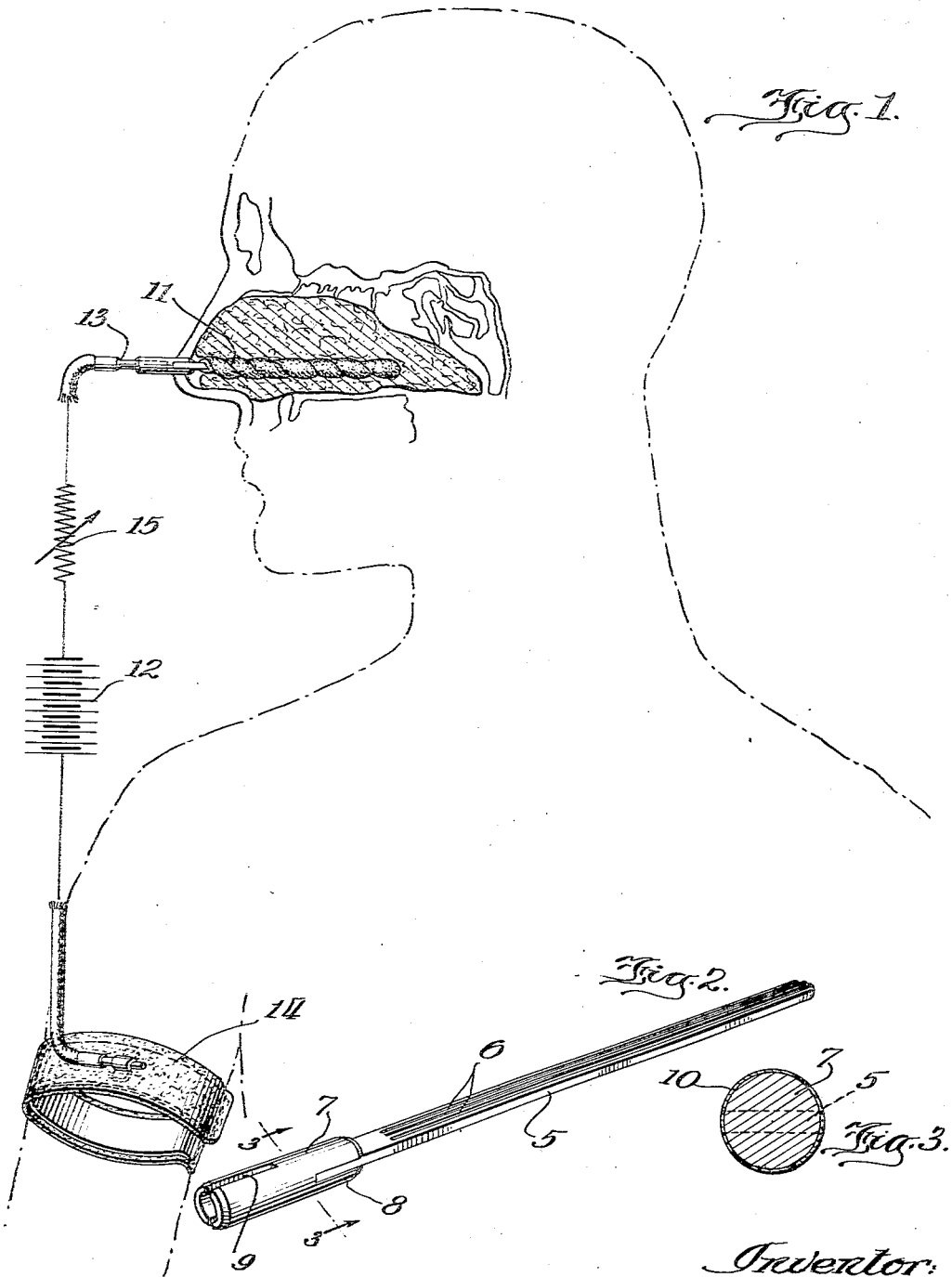

Patented July 19, 1938

2,123,980

UNITED STATES PATENT OFFICE 2,123,980

THERAPEUTIC TREATMENT

Harold Lynwood Warwick, Fort Worth, Tex., assignor to G. M. Basford Company, New York, N. Y., a corporation of New York Application July 21, 1934, Serial No. 736,359

4 Claims. (Cl. 128—172.1)

My invention relates to the therapeutic treatment of hay fever, hyperaesthetic rhinitis, and allergic asthma, and other disorders, such as are or seem to be induced by exogeneous protein irritation of the mucous membranes of the nose and nasopharynx.

The principal objects of my invention are to provide equipment and a method of employing the same—a technique—for the treatment of the aforementioned conditions by electric ionization.

In general, the preferred equipment comprises an active electrode for insertion into a nasal cavity, an electrolyte, a vehicle for bringing the electrolyte into and maintaining it in contact with the membranes lining the walls, the turbinates and the septum of the nose and the nasopharynx, a source of current for effecting ionic migration between the electrode, electrolyte and membranes, and preferably also an arrangement for testing or gauging the initial relationship or condition existing between the electrolyte, electrode and tissue to insure proper treatment.

In the accompanying drawing:

Fig. 1 illustrates diagrammatically the equipment applied to the nose for a treatment;

Fig. 2 is an enlarged perspective view of a suitable form of active electrode for ordinary or the usual run of treatments, and Fig. 3 is a section on the line 3—3 of Fig. 2, on an enlarged scale.

The electrode

The electrode consists of aproximately 85% zinc (A. R.), 5% cadmium (A. R.), and 10% tin (A. R.) by weight. As indicated, the purity of these metals is preferably the highest procurable, that is A. R. (analytical reagent) as distinguished from C. P. (chemically pure). More specifically the preferred method of making the electrode material is to melt together ten (10) ounces of tin and five (5) ounces of cadmium. Next eighty-five (85) ounces of zinc are melted, and the prepared molten mixture of tin and cadmium added thereto, the three molten ingredients being stirred together, preferably by means of a pine stick, which will cause the addition of sufficient carbon to prevent objectionable oxidation.

After the molten ingredients are thus thoroughly stirred, the resultant hot metal is poured and cast in a previously heated mold to form an ingot or slab, from which the electrodes of proper size and shape may be formed. I have found an ingot cast approximately to dimensions of $\frac{3}{16}$" x 3½" x 6" is a suitable and convenient size. While in the mold the metal is allowed to cool slowly until it reaches a temperature of approximately 100° C., whereupon it is put in asbestos to cool. The ingot or slab is then allowed to age for about seventy-two (72) hours or longer at a room temperature of about 27.8° C.

The slab or ingot is next sanded on all sides and polished, and then sawed into strips each approximately $\frac{5}{32}$" x $\frac{1}{16}$" x 3¼" and weighing approximately 2 grams. Each such strip forms the active portion 5 of an active electrode, such as illustrated in Fig. 2. If desired, the exposed or effective surfaces of each electrode may be increased by milling small grooves 6 into each side, as shown clearly in Fig. 2.

A suitable electrical terminal or connector 7 is applied to one end of each finished electrode strip. A simple and effective connector comprises a tubular brass nipple about $\frac{3}{16}$" in diameter and ¾" long. One end of the nipple is slotted as at 8, tightly to receive the end of the electrode bar or strip, and the other or outer end may be similarly slotted as at 9, so as to provide a somewhat resilient socket for receiving the end of an ordinary pin connector, such as commonly used in electrical work. If desired, the electrode bar and connector nipple may be soldered or otherwise additionally fastened together. The terminal connector is preferably given a coating 10 of suitable insulation, such as by dipping the same into an enamel of the cellulose nitrate type such as Duco enamel or into a rubber solution, to insulate the same from the tissues when the electrode is inserted into the nose, thus preventing burning of the skin or membrane. The finished electrode is sterilized by heating the same for twenty (20) minutes at a temperature of about 116° C. Electrodes thus finished should be sealed in suitable sterile envelopes until required for treatments.

The electrolyte

The electrolyte is a solution approximately 1.89% zinc sulphate (A. R.), 0.19% stannous sulphate (A. R.), 0.09% cadmium sulphate (A. R.) and 97.83% distilled water. More specifically, the preferred electrolyte may be prepared by mixing one hundred forty-four (144) grains of zinc sulphate, fourteen and four-tenth (14.4) grains of stannous sulphate, seven and two-tenths (7.2) grains of cadmium sulphate and distilled water sufficient to make sixteen (16) ounces by weight.

Vehicle for electrolyte

The vehicle for applying the electrolyte to and retaining it in the nasal cavity and nasopharnyx in complete and intimate contact with all of the membranes and the electrode may be any suitable absorbent material, such as sterile cotton. Preferably the cotton should be grade A, formed into a strip of ribbon about ⅜" wide and cut in lengths of about 3 feet in order to facilitate handling and application. The cotton is flaked out as thin as practicable, then pressed in any approved manner, such as by passing the strip between rollers. These strips may be wound upon spools for storage until they are to be used.

The source of current

Any suitable source of ionizing current which will provide the necessary voltage may be used. I prefer to employ a small motor generator set delivering relatively low voltage direct current. In order to insure adequate protection to the patient, I prefer to use a source which can not deliver current at a voltage above 75 volts.

The technique

In order to relieve the patient from the discomfort of the subsequent packing with the electrolyte-saturated cotton, I consider it desirable slightly to anesthetize locally the region to be treated. This result may be obtained by lightly packing the nasal cavity on one side of the septum with cotton saturated with a suitable local anesthetic; a solution including 1½ per cent (1.5%) cocaine in a 1½ per cent (1.5%) solution of ephedrin has been found to give good results. Leaving this anesthetic pack in the nasal cavity for about ten minutes will ordinarily create a sufficiently effective condition of local anesthesia of the tissue and membrane within the nasal cavity. The anesthetic pack is then removed and the cavity carefully packed with the electrolyte-saturated cotton. After the upper portion of the nasal cavity has been thus packed up to about the bottom level of the nasal opening, the electrode is inserted into the cavity, the connector end being left to protrude from the nose sufficiently to enable the terminal of the current conductor to be attached thereto. In order to insure an intimate and good current conducting contact between the electrode and the saturated pack, I have found it to be a good plan to wind a strip 11 of the saturated cotton spirally about the electrode from end to end of its uncovered or active surface. After the electrode has been thus inserted, the rest of the cavity is carefully packed until the entire surface of the tissue or membrane lining of the walls, turbinates, one side of the septum and a portion of the nasopharynx is in contact with the saturated cotton. The packing should be applied tightly enough to hold the electrode in place and insure the maintenance of the desired intimate relationship between it and the membrane or tissue surfaces, but not tightly enough to injure the membranes or otherwise cause discomfort or injury.

After the cavity has been thus properly packed the positive pole of the source of ionizing current 12 is connected to the active electrode by any suitable means, such as by a pin connector 13 fitted into the socket in the terminal and the negative pole of the source is connected to the patient's body at some convenient place, such as the arm, by a suitable current conducting band 14 and, by means of a rheostat 15, the current is gradually increased to about 10 milliamperes. The current at this value is allowed to flow for 10 minutes and then gradually reduced and turned off, and the electrode and pack are removed.

In order initially to gauge the effectiveness of the pack I have found it advisable to determine approximately the resistance of the circuit including the electrode and electrolyte-saturated vehicle. This may be done by connecting an ohm meter and a low voltage battery to the active electrode and to the part of the patient's body where the other circuit contact is to be made, such as the arm. A 4½ volt storage or primary battery has been found to give good results in such a test circuit. Of course, the resistance, even with satisfactory packing and saturation, will vary with different patients but I have found that a resistance of from 2500 to 3000 ohms indicates a satisfactory condition under most circumstances.

The foregoing technique is then repeated for the cavity on the other side of the septum.

Of course, conditions may be found where a current flow of 10 milliamperes for 10 minutes will be insufficient to produce the desired results, or too great for the endurance of some patients. In the average case, however, 10 milliamperes is about the limit of tolerance and also a point of neutrality. This current and time gives a migration of the metals of about two millimeters.

Having thus described the nature and a typical embodiment and application of my invention, what I claim and desire to secure by United States Letters Patent is as follows:

1. An allergic treatment electrolyte solution containing the following ingredients in substantially the proportions given:

| | Per cent |
|---|---|
| Zinc sulphate | 1.89 |
| Stannous sulphate | 0.19 |
| Cadmium sulphate | 0.09 |
| Water | 97.83 |

2. An allergic treatment electrode containing the following ingredients in substantially the proportions given:

| | Per cent |
|---|---|
| Zinc | 85 |
| Cadmium | 5 |
| Tin | 10 |

3. Therapeutic equipment for internally treating a nasal cavity with electrolytic components of a plurality of electrolyzable products, comprising an electrolyzable solution which comprises about 1.89% of ionizable zinc salt, about 0.19% ionizable tin salt and about 0.09% ionizable cadmium salt, an absorbent nasal cavity applicator saturated with said solution for bringing the same into intimate contact with the membranes lining the nasal cavity, and means for electrolyzing said salts in the nasal cavity including an active electrode embedded in said applicator, an indifferent electrode, and a source of ionizing electrical energy electrically connected to both of said electrodes.

4. In therapeutic equipment for internally treating a nasal cavity with electrolytic components of a plurality of electrolyzable products, an electrolyzable solution of ionizable salts of a plurality of metals from the groups including zinc, tin and cadmium, a composite nasal cavity electrode consisting of about 85% zinc, about 10% tin and about 5% cadmium, and means cooperating with said solution and said electrode for producing ionic migration within a nasal cavity.

HAROLD LYNWOOD WARWICK.